United States Patent
Szegedy et al.

(10) Patent No.: US 9,275,308 B2
(45) Date of Patent: Mar. 1, 2016

(54) OBJECT DETECTION USING DEEP NEURAL NETWORKS

(71) Applicant: Google Inc., Mountain View, CA (US)

(72) Inventors: Christian Szegedy, Sunnyvale, CA (US); Dumitru Erhan, Venice, CA (US); Alexander Toshkov Toshev, San Francisco, CA (US)

(73) Assignee: Google Inc., Mountain View, CA (US)

( * ) Notice: Subject to any disclaimer, the term of this patent is extended or adjusted under 35 U.S.C. 154(b) by 11 days.

(21) Appl. No.: 14/288,194

(22) Filed: May 27, 2014

(65) Prior Publication Data

US 2015/0170002 A1 Jun. 18, 2015

Related U.S. Application Data

(60) Provisional application No. 61/830,011, filed on May 31, 2013.

(51) Int. Cl.
*G06K 9/62* (2006.01)
*G06K 9/66* (2006.01)

(52) U.S. Cl.
CPC ........................................ *G06K 9/66* (2013.01)

(58) Field of Classification Search
CPC ...... G06K 9/66; G06K 9/4628; G06K 9/6256
USPC ......................................... 382/156, 159, 103
See application file for complete search history.

(56) References Cited

U.S. PATENT DOCUMENTS

| 7,720,289 B2 * | 5/2010 | Porikli et al. ................. 382/195 |
| 2014/0185925 A1 * | 7/2014 | Datta et al. ................... 382/159 |

OTHER PUBLICATIONS

Ciresan et al: "Multi-column deep neural networks for image classification", IEEE, 2012.*
Dalai et al: "Histograms of oriented gradients for human detection", IEEE, 2005.*
Ahuja and Todorovic, "Learning the taxonomy and models of categories present in arbitrary images," In Computer Vision, 2007. ICCV 2007. IEEE 11th International Conference on Computer Vision, pp. 1-8. IEEE, 2007.
Bengio, "Learning deep architectures for AI," Foundations and Trends® in Machine Learning, 2(1):1-127, 2009.
Ciresan et al., "Deep neural networks segment neuronal membranes in electron microscopy images," in Advances in Neural Information Processing Systems 25, pp. 2852-2860, 2012.
Dalal and Triggs, "Histograms of oriented gradients for human detection," In Computer Vision and Pattern Recognition, 2005. CVPR 2005. IEEE Computer Society Conference on, vol. 1, pp. 886-893. IEEE, 2005.

(Continued)

*Primary Examiner* — Ruiping Li
(74) *Attorney, Agent, or Firm* — Fish & Richardson P.C.

(57) ABSTRACT

Methods, systems, and apparatus, including computer programs encoded on computer storage media, for detecting objects in images. One of the methods includes receiving an input image. A full object mask is generated by providing the input image to a first deep neural network object detector that produces a full object mask for an object of a particular object type depicted in the input image. A partial object mask is generated by providing the input image to a second deep neural network object detector that produces a partial object mask for a portion of the object of the particular object type depicted in the input image. A bounding box is determined for the object in the image using the full object mask and the partial object mask.

21 Claims, 12 Drawing Sheets

(56) References Cited

OTHER PUBLICATIONS

Deng et al., "ImageNet: A Large-Scale Hierarchical Image Database," In IEEE Conference on Computer Vision and Pattern Recognition, 2009, 248-255.
Duchi et al., "Adaptive subgradient methods for online learning and stochastic optimization," In Conference on Learning Theory (COLT), 2010 ACL Conference on. ACL, 2010, 1-40.
Everingham et al., "The PASCAL visual object classes (VOC) challenge," International Journal of Computer Vision, 88(2):303-338, Jun. 2010.
Farabet et al., "Learning hierarchical features for scene labeling," IEEE Transactions on Pattern Analysis and Machine Intelligence, 35(8):1915-1929, Aug. 2013.
Felzenszwalb et al., "Object detection with discriminatively trained part-based models," IEEE Transactions on Pattern Analysis and Machine Intelligence, 32(9):1627-1645, 2010.
Fidler and Leonardis, "Towards scalable representations of object categories: Learning a hierarchy of parts," In Computer Vision and Pattern Recognition, 2007. CVPR'07. IEEE Conference on, pp. 1-8. IEEE, 2007.
Hinton and Salakhutdinov, "Reducing the dimensionality of data with neural networks," Science, 313(5786):504-507, Jul. 28, 2006.
Hinton et al., "Improving neural networks by preventing co-adaptation of feature detectors" CoRR, abs/1207.0580, Jul. 3, 2012, 1-18.
Kokkinos and Yuille, "Inference and learning with hierarchical shape models," International journal of computer vision, 93(2):201-225, 2011.
Krizhevsky et al., "ImageNet classification with deep convolutional neural networks," In Advances in Neural Information Processing Systems 25, pp. 1106-1114, 2012.
Le et al., "Building high-level features using large scale unsupervised learning," In International Conference on Machine Learning, Jul. 12, 2012, 11 pages.
LeCun and Bengio, "Convolutional networks for images, speech, and time series," The handbook of brain theory and neural networks, 1998, 255-258.
Sanchez and Perronnin, "High-dimensional signature compression for large-scale image classification," In 2011 IEEE Conference on Computer Vision and Pattern Recognition (CVPR), 1665-1672, Jun. 20-25, 2011.
Schulz and Behnke, "Object-class segmentation using deep convolutional neural networks," In Proceedings of the DAGM Workshop on New Challenges in Neural Computation, pp. 58-61, Aug. 2011.
Zhu et al., "Latent hierarchical structural learning for object detection," In Computer Vision and Pattern Recognition (CVPR), 2010 IEEE Conference on, pp. 1062-1069. IEEE, 2010.
Zhu and Mumford, "A stochastic grammar of images," Foundations and Trends® in Computer Graphics and Vision, 2(4):259-362, Jan. 2006.

\* cited by examiner

OBJECT DETECTION USING DEEP NEURAL NETWORKS

CROSS REFERENCE TO RELATED APPLICATIONS

This application claims the benefit under 35 U.S.C. §119 (e) of the filing date of U.S. Provisional Patent Application No. 61/830,011, filed on May 31, 2013, entitled "Object Detection Using Deep Networks," the entirety of which is herein incorporated by reference.

BACKGROUND

This specification relates to detecting objects in images.

Deep neural networks (DNNs), or "deep networks," are machine learning systems that employ multiple layers of models, where the outputs of lower level layers are used to construct the outputs of higher level layers.

Object detection includes determining one or more portions of an image that include an object. The portions of an image that include the object can be designated by a bounding shape, e.g., a bounding box. An object mask indicates which portions of the image include the object and which portions of the image do not include the object. For example, for each pixel in an image, an object mask can assign a value of zero if the pixel is not part of the object in the image and a value of one if the pixel is part of the object.

SUMMARY

This specification describes how a system can use deep neural networks to detect objects in images. In particular, the system can use deep neural networks that generate, for an input image and a particular object type, full and partial object masks that defines regions in the image that include the object. Multiple candidate bounding boxes can be generated and ranked based on their correspondence to the full and partial object masks generated by the deep neural networks. The bounding boxes can be generated and refined at multiple scales and aspect ratios and for multiple object types.

In general, one innovative aspect of the subject matter described in this specification can be embodied in methods that include the actions of receiving an input image; generating a full object mask by providing the input image to a first deep neural network object detector that produces a full object mask for an object of a particular object type depicted in the input image, wherein the full object mask identifies regions of the input image that correspond to the object and regions of the input image that do not correspond to the object; generating a partial object mask by providing the input image to a second deep neural network object detector that produces a partial object mask for a portion of the object of the particular object type depicted in the input image; and determining a bounding box for the object in the image using the full object mask and the partial object mask. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The portion of the object corresponds to the bottom portion, the top portion, the left portion, or the right portion of the object. The bounding box has a partial bounding box corresponding to the partial object mask, and determining the bounding box for the object in the image using the full object mask and the partial object mask includes determining a bounding box that has a best fit, among a plurality of candidate bounding boxes, of the full bounding box with the full object mask and the partial bounding box with the partial object mask. Determining a bounding box for the object in the image using the full object mask and the partial object mask includes computing a score for each of a plurality of candidate bounding boxes based on a first measure of overlap between the bounding box and the full object mask and a second measure of overlap between the bounding box and the partial object mask; and determining a bounding box having a highest score. The score for a candidate bounding box bb is given by $$S(bb) = \sum_{h} \left( S(bb(h), m^h) - S(bb(\bar{h}), m^{\bar{h}}) \right),$$

wherein bb(h) is a partial bounding box for a corresponding partial object mask $m^h$, wherein bb($\bar{h}$) is an opposite partial bounding box for a corresponding opposite partial object mask $m^{\bar{h}}$, and $S(bb(h), m^h)$ is a measure of overlap between the partial bounding box and the partial object mask. The actions include generating a second full object mask by providing a portion of the image corresponding to the bounding box to the first deep neural network object detector; generating a second partial object mask by providing the portion of the image corresponding to the bounding box to the second deep neural network object detector; computing a score for each of a second plurality of candidate bounding boxes based on a third measure of overlap between each bounding box and the second full object mask and a fourth measure of overlap between each bounding box and the second partial object mask; and determining a refined bounding box of the second plurality of candidate bounding boxes having a highest score. The actions include determining full and partial object masks for subwindows of each of multiple subwindow scales; and merging object masks determined at same values of the subwindow scales. Determining full and partial object masks for subwindows of each of multiple subwindow scales comprises determining full and partial object masks for no more than 50 subwindows. The method of claim 7, wherein merging the object masks determined at the multiple values of the scale s comprises averaging the object masks. The actions include generating a predicted object type by providing the input image to a third deep neural network classifier that produces a predicted object type for a portion of the image corresponding to the bounding box; determining that the predicted object type does not match the particular object type; and removing the bounding box from consideration.

Particular embodiments of the subject matter described in this specification can be implemented so as to realize one or more of the following advantages. A system can leverage deep neural networks for robust object detection. The resulting method is simpler than other object detection approaches, and there is no need for manually designing models or features for a particular object type. The full input image can be used, allowing object detection in context. Objects of a wide variety of types can be detected. The use of partial object masks can disambiguate objects that are overlapping in the image or close together in the image. Higher resolution object masks, up to and including pixel-level object masks, can be generated rather than object bounding boxes. The system can perform non-rectangular detections using the higher resolution object masks. High quality object detection can be performed without performing deep neural network detection using a sliding window approach. The resulting increase in speed and quality allows object detection to be performed for applications that require low latency, e.g., self-driving cars The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
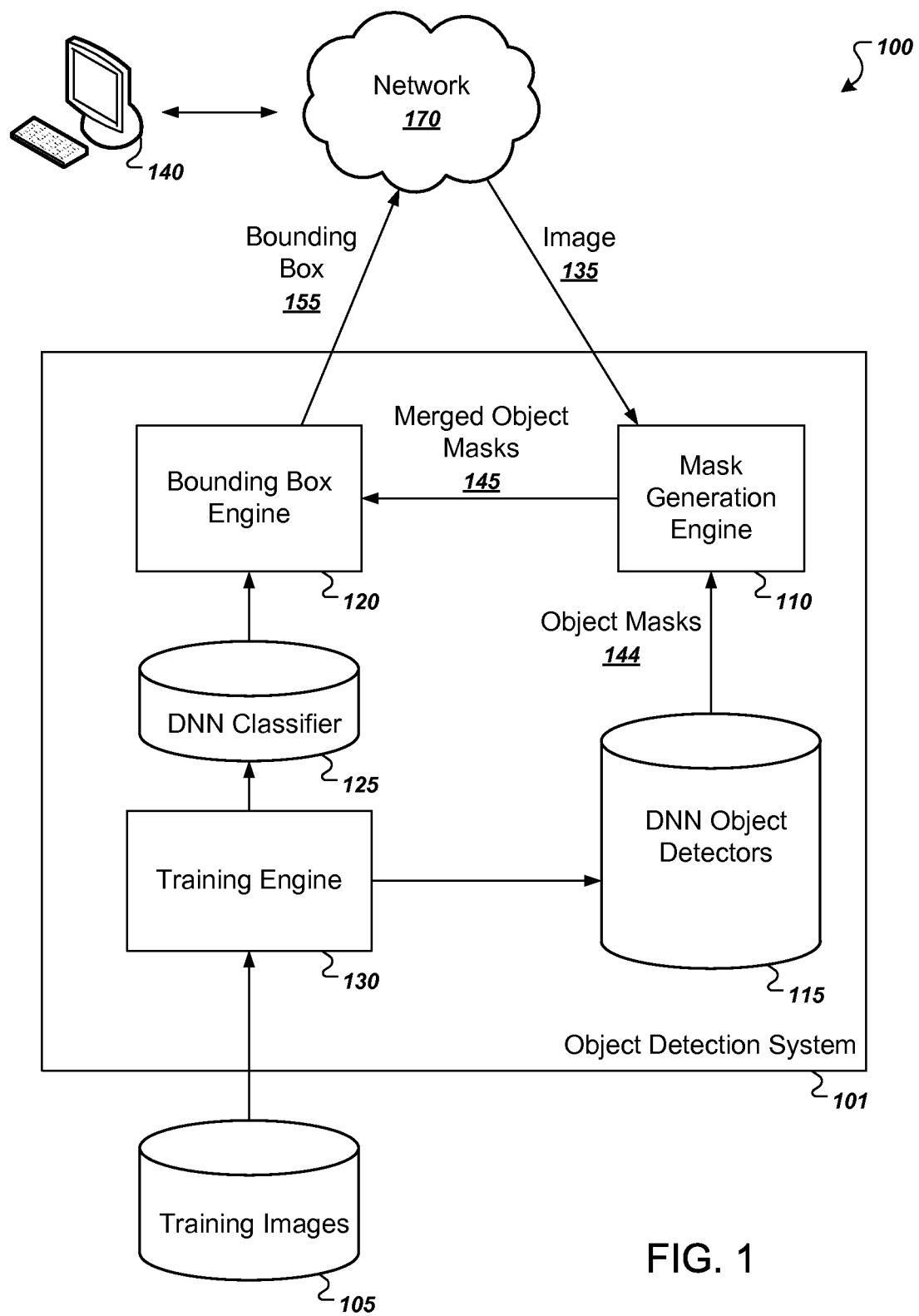
FIG. 1 illustrates an example system.

FIG. 1 illustrates an example system. The system includes a user device 140 in communication with an object detection system 101 over a network 170. The object detection system 101 can use one or more deep neural networks to determine one or more portions of the image 135 that include an object.

The object detection system 101 includes several functional components, including a mask generation engine 110, a bounding box engine 120, and a training engine 130. The components of the object detection system 101 can be implemented as computer programs installed on one or more computers in one or more locations that are coupled to each other through a network.

A user of user device 140 can provide an image 135 to the object detection system 101. The user device 140 can communicate with the object detection system 101 over the network 170, which can be any appropriate communications network, e.g., an intranet or the Internet. For example, the user can either upload an image file to the object detection system 101 or provide the location of an image, e.g. a uniform resource locator (URL). Alternatively, the object detection system can be installed in whole or in part on the user device 140.

A mask generation engine 110 receives the image 135 and generates merged object masks 145 using object masks 144 that are output by multiple deep neural network (DNN) object detectors 115. In general, the system trains full and partial DNN object detectors 115 to output object masks 144 for different portions of an object, e.g., a whole portion in the case of a full object detector, and a top portion, a bottom portion, a left portion or a right portion in the case of partial object detectors. In addition, the system can train each full or partial DNN object detector 115 for an object of a particular object type, e.g., cats or cars. In this specification, an "object type" may actually refer to a class of objects, e.g., animals or vehicles.

The mask generation engine 110 may obtain full and partial object masks 144 having a particular object type using the DNN object detectors 115 using multiple different subwindows of the image 135 at multiple scales and locations within the image. The mask generation engine 110 can then merge corresponding full and partial object masks 144 generated by the full and partial object detectors to generate merged full and partial object masks 145. In general, the merged object masks 145 have an object type corresponding to the object type of the set of DNN object detectors 115 used to generate the merged object masks 145.

The merged object masks 145 can be used by a bounding box engine 120 to generate a bounding box 155 for the object in the image 135. However, in some implementations, for example, when the user is interested in only segmentation analysis of the image 135, the object detection system 101 can return the merged object masks 145 to the user before generating the bounding box 155.

The training engine 130 can use training images in a collection of training images 105 to train the full and partial DNN object detectors 115. The training engine 130 can generate a different set of DNN object detectors for each of a variety of object types, e.g., a first set of DNN object detectors for cats and a second set of DNN object detectors for cars.

The training engine 130 can also use the training images to train a DNN classifier 125. In general, the training engine 130 will train the DNN classifier 125 to predict object types for each of the object types of all the of DNN object detectors 115. In other words, the DNN classifier 125 can be trained to determine a most likely object type, e.g., whether the object is more likely to be a cat or a car.

The bounding box engine 120 receives the merged object masks 145 and determines a most likely bounding box 155 for the object in the image. The bounding box engine 120 can consider multiple candidate bounding boxes and determine which of the candidate bounding boxes best fit the merged object masks 145.

The bounding box engine 120 can also use a DNN classifier 125 as a filter to discard candidate bounding boxes. For example, the bounding box engine 120 can use a DNN classifier 125 to determine a most likely object type in a candidate bounding box, e.g., a cat. If the determined most likely object type does not match the object type of the merged object masks 145, the bounding box engine 120 can discard the candidate bounding box.

After determining a most likely bounding box 155, the object detection system 101 can return information describing the bounding box 155 to the user device 140 over the network 170. For example, the object detection system 101 can return bounding box coordinates or a marked-up image that shows the bounding box 155 overlaid on the image.

Figure 2:
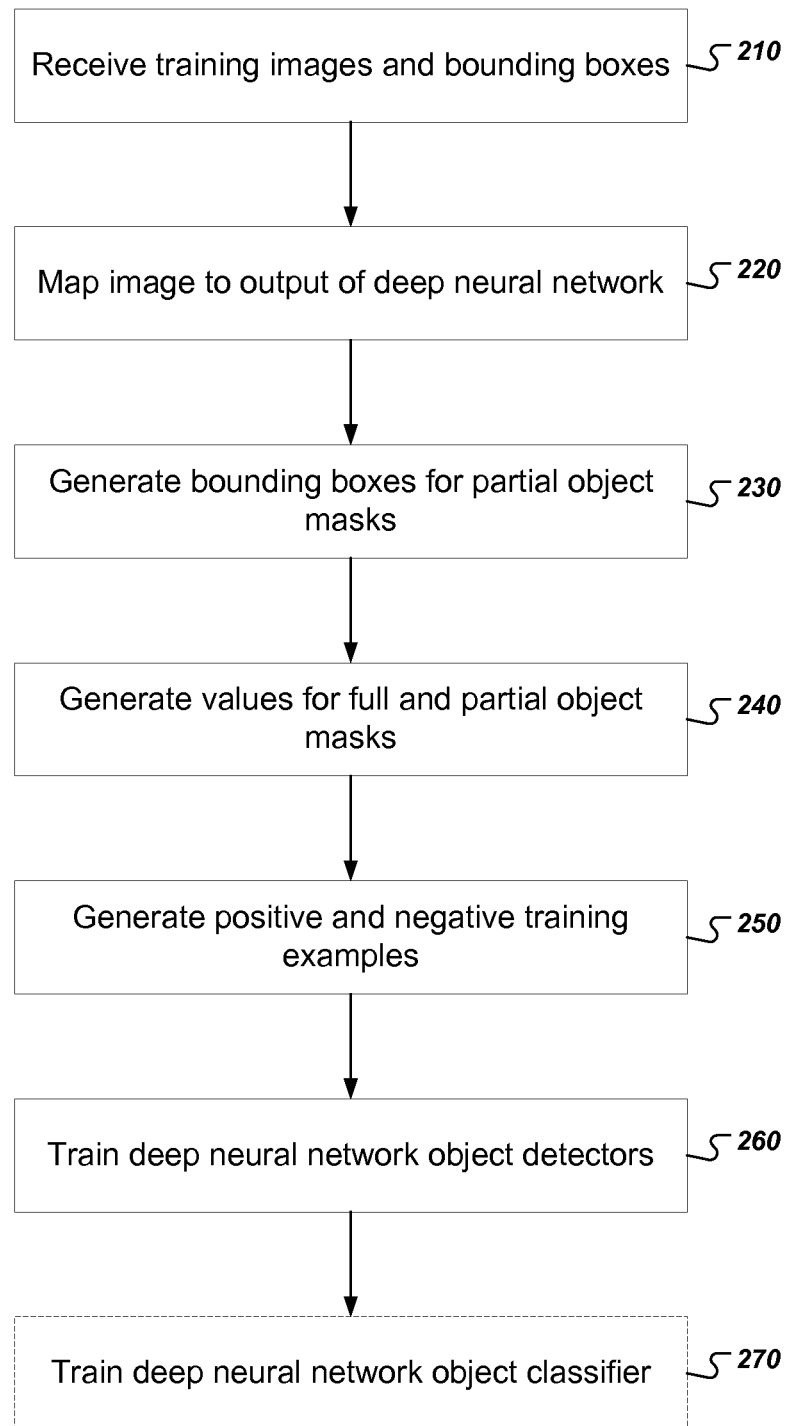
FIG. 2 is a flow chart of an example process for training deep neural networks for object detection.

FIG. 2 is a flow chart of an example process for training deep neural networks for object detection. In general, the system trains a different deep neural network to detect a separate part of objects of a particular type. The process can be implemented by one or more computer programs installed on one or more computers. The process will be described as being performed by an appropriately programmed system of one or more computers, e.g., the training engine 130 of FIG. 1.

The system receives training images and bounding boxes (210). The training images will generally include images of objects for the particular object type being trained. Each training image will also include bounding box information that designates where in the image the object is located. For example, the bounding box for an image can be designated by upper left and lower right coordinates of the bounding box within the image.

Figure 3A:
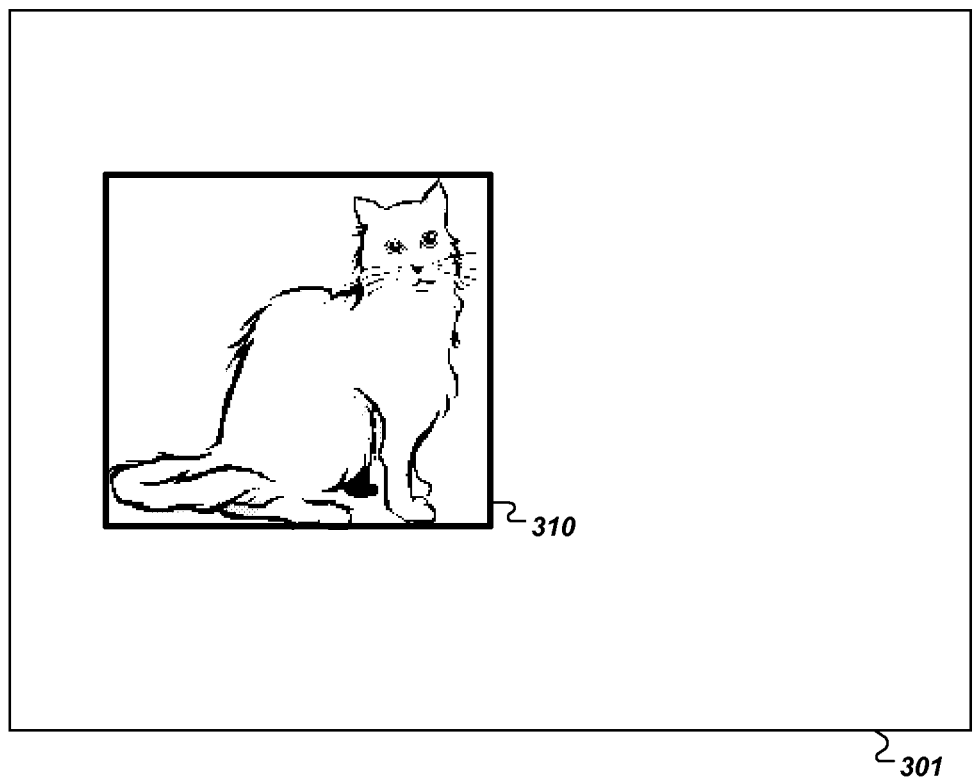
FIG. 3A illustrates an example image and bounding box.

FIG. 3A illustrates an example image 301 and bounding box 310. A cat is included in the image 301 and the bounding box 310 outlines the cat in the image 301. Typically, the image 301 itself does not illustrate the bounding box 310. Rather, the bounding box 310 is designated by pairs of pixel coordinates.

As shown in FIG. 2, the system maps the image to the output of the deep neural network (210). To train the deep neural network, the system generates object masks that correspond to the output of the deep neural network. In some implementations, the output of the deep neural network being trained is a matrix having a fixed size, e.g., a N×M matrix of values. The values of the output matrix represent the object mask when mapped to the image. Thus, the system can generate an object mask for the image by mapping portions of the image to correspond to each value in the output matrix.

Figure 3B:
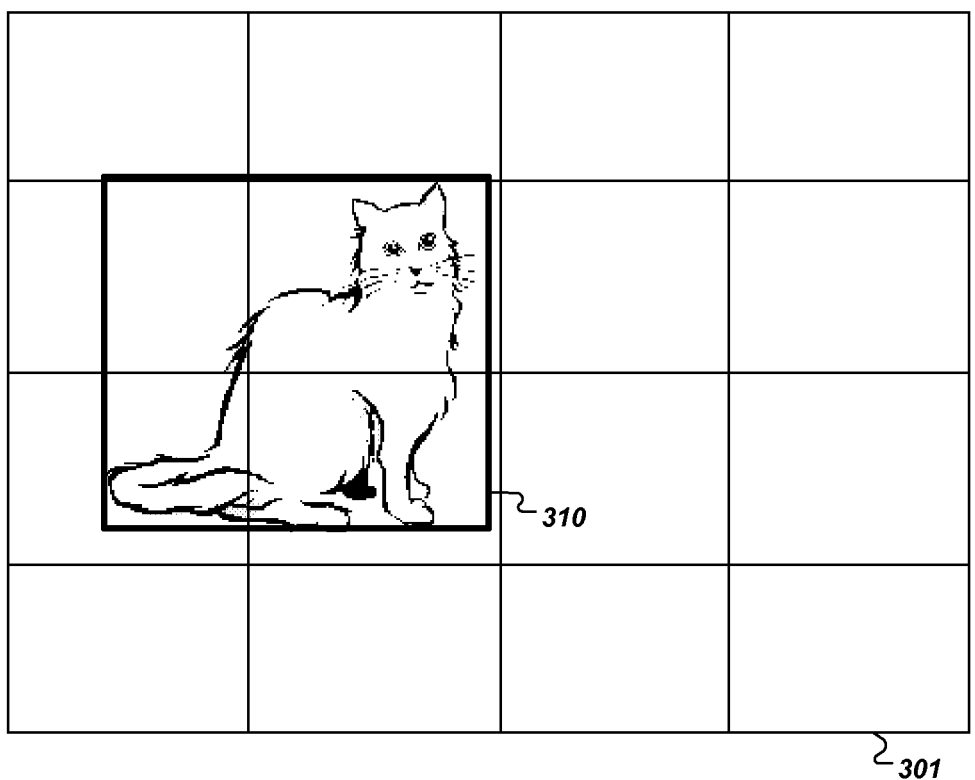
FIG. 3B illustrates the image being mapped to the size of an output matrix.

FIG. 3B illustrates the image 301 being mapped to the size of an output matrix. In this example, the output matrix is a 4×4 matrix. Thus, the system can partition the image into a 4×4 grid of partitions having substantially equal size.

The system generates bounding boxes for partial object masks (230). In order to improve object detection, the system can generate partial object masks that predict different parts of the bounding box. In other words, instead of generating only a single object mask for the original bounding box, the system can generate bounding boxes for multiple partial object masks for a single image, where each partial object mask corresponds to a different part of the bounding box in the image. Each partial object mask has a corresponding bounding box that designates a location, in the image, of a particular portion of the object.

Figure 3C:
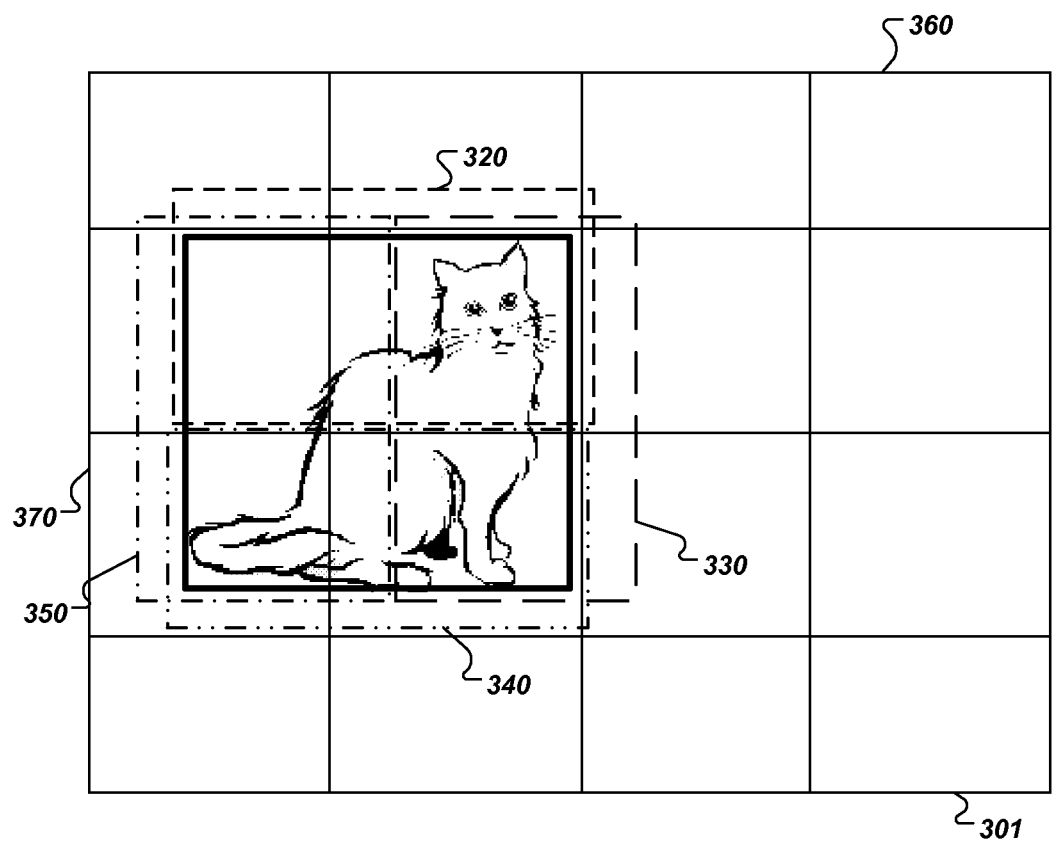
FIG. 3C illustrates bounding boxes of partial object masks.

FIG. 3C illustrates bounding boxes of partial object masks. For example, the bounding box 320 designates the location of a partial object mask for predicting the top part of the object. Similarly, the bounding box 330 designates the location of a partial object mask for predicting the right part of the object, the bounding box 340 designates the location of a partial object mask for predicting the bottom part of the object, and the bounding box 350 designates the location of a partial object mask for predicting the left part of the object.

In some implementations, the bounding boxes of the partial object masks substantially correspond to halves of the original bounding box for the whole object. The partial object masks may overlap each other and may extend beyond or short of the original bounding box. Although four bounding boxes of partial object masks are shown, the system can use any appropriate partition or coverage of the original bounding box, e.g., quarters or corners of the original bounding box.

As shown in FIG. 2, the system generates values for full and partial object masks (240). In general, for each object mask the system generates a value for each partition of the image. For example, the system can generate an object mask for the original bounding box by generating nonzero values for each partition of the image that overlaps the bounding box as corresponding to the object, e.g., having a value of 1, and generating zero values for each partition of the image that does not overlap the bounding box as not corresponding to the object.

In some implementations, the system computes a value for each partition according to how much of the partition overlaps the bounding box. In other words, the object mask values can be based on the area of the partition covered by the bounding box. For a partition $T(i, j)$, where i and j are row and column coordinates of the image partition, the system can compute the object mask value for a full or partial object mask h according to:

$$m^h = \frac{\text{area}(bb(h) \cap T(i, j)}{\text{area}(T(i, j))}, \qquad (1)$$

where bb(h) designates a bounding box for h and bb(h)∩T(i, j) designates the portion of the image partition that overlaps the bounding box for h.

For example, in FIG. 3C, the partition 360 corresponding to $T(1, 4)$ would have an object mask value of 0 for all full and partial object masks. The partition 370 corresponding to $T(3, 1)$ would have an object mask value of around 0.6 for the left partial object mask of bounding box 350 and also for the full object mask of the original bounding box 310. However, the partition 370 would have an object mask value of 0 for the right partial object mask of bounding box 330.

As shown in FIG. 2, the system generates positive and negative training examples (250). To generate training examples, the system generates multiple crops of the image and its corresponding full and partial object masks. In other words, the system selects only a portion of the image and its object masks and discards the rest.

The system can consider as a positive training example an image crop that overlaps the full bounding box by at least a threshold amount, e.g., 50%, 80% or 90%. The system can consider other image crops to be negative training examples. In some implementations, the system considers negative training examples to be image crops that overlap no original bounding boxes. The system can increase the size of the training set by using image crops of multiple scales and positions in the image.

The system trains full and partial deep neural network object detectors (260). Each deep neural network object detector defines a plurality of layers of operations, including a final regression layer that generates the object mask. In general, the system trains each deep neural network by minimizing the L2 error for predicting a ground truth object mask of a training image.

In general, the system trains a separate deep neural network object detector for each type of object mask. For example, in the example shown in FIG. 3C, the system would train five deep neural networks: one full object detector for the full object mask, and one partial object detector for each of the four partial object masks. In general, the full object detector will output predicted values for a full object mask, and each partial object detector will output predicted values for a partial object mask.

In order to improve the detection of small objects, the system can increase the penalty for false negative detections of small objects during training. In other words, for objects below a particular threshold size, the system can augment the penalty for a false detection. To do so, the system can increase the weights of the neural network outputs that correspond to nonzero values for the full and partial object masks.

The system can alternatively train a single deep neural network that outputs all full and partial object masks. Similarly, the system can alternatively train a single deep neural network for all object types.

The system optionally trains a deep neural network classifier (270). The deep neural network classifier can be trained to predict a most likely object type of a plurality of object types. Thus, the system can train the DNN classifier using the training images for the object detectors as well as other training images generate for objects of other types.

Figure 4:
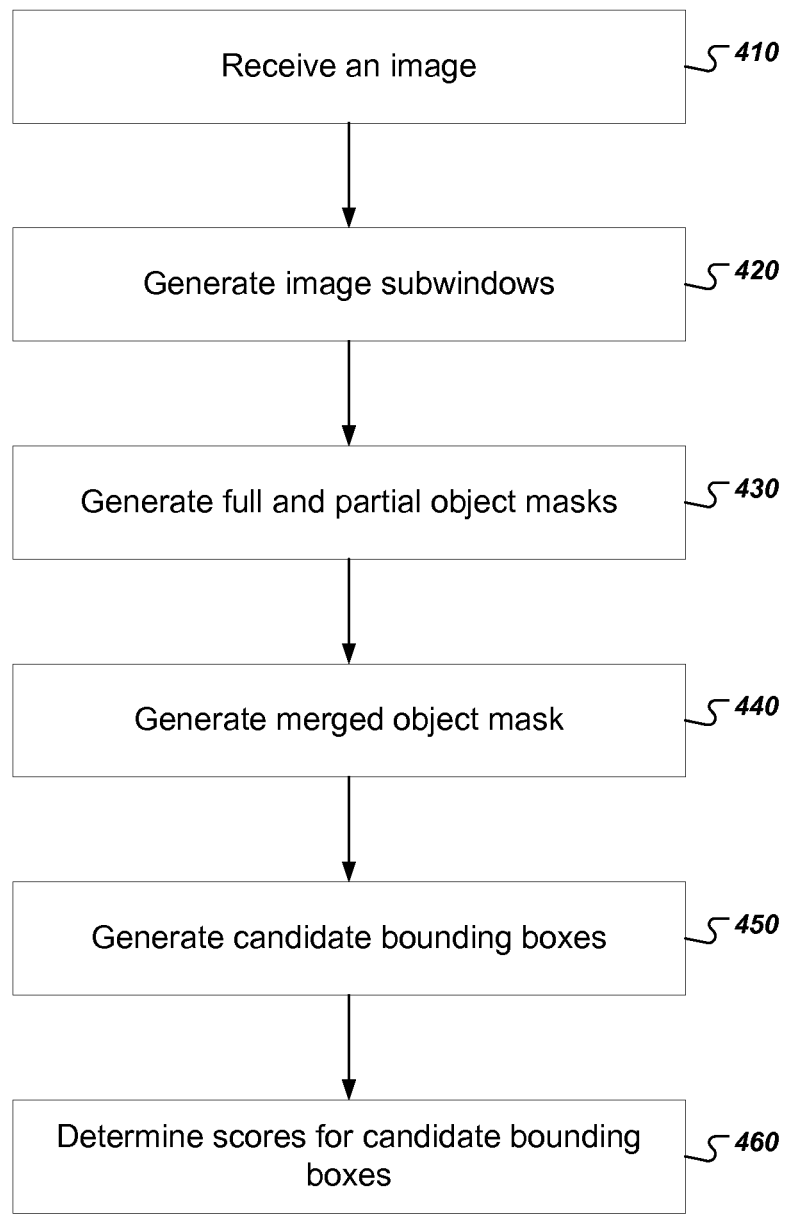
FIG. 4 is a flow chart of an example process for generating an object bounding box for an image.

FIG. 4 is a flow chart of an example process for generating an object bounding box for an image. In general, the system uses full and partial object detectors to generate full and partial object masks. The system can then use the full and partial object masks to determine a most likely bounding box for the object in the image. The process will be described as being performed by an appropriately programmed system of one or more computers, e.g., the mask generation engine 110 and the bounding box engine 120 of FIG. 1.

The system receives an image (410). The system can receive an image for object detection in a wide variety of contexts. For example, the system can receive an image uploaded by a user desiring to classify a particular type of object in the image, e.g., a car or an animal in the image. The system can be installed as part of a self-driving vehicle, and the received image can be an image of the environment in which the vehicle is traveling captured by an integrated camera on board the vehicle. The system can also receive an image of a document as part of an optical character recognition system. The system can also receive the image as part of an image manipulation tool for identifying objects in images for performing various kinds of automatic manipulations to the object in the image.

The system generates image subwindows (420). The system can improve object detection by attempting to detect objects in multiple subwindows of the image at multiple positions and scales.

Figure 5A:
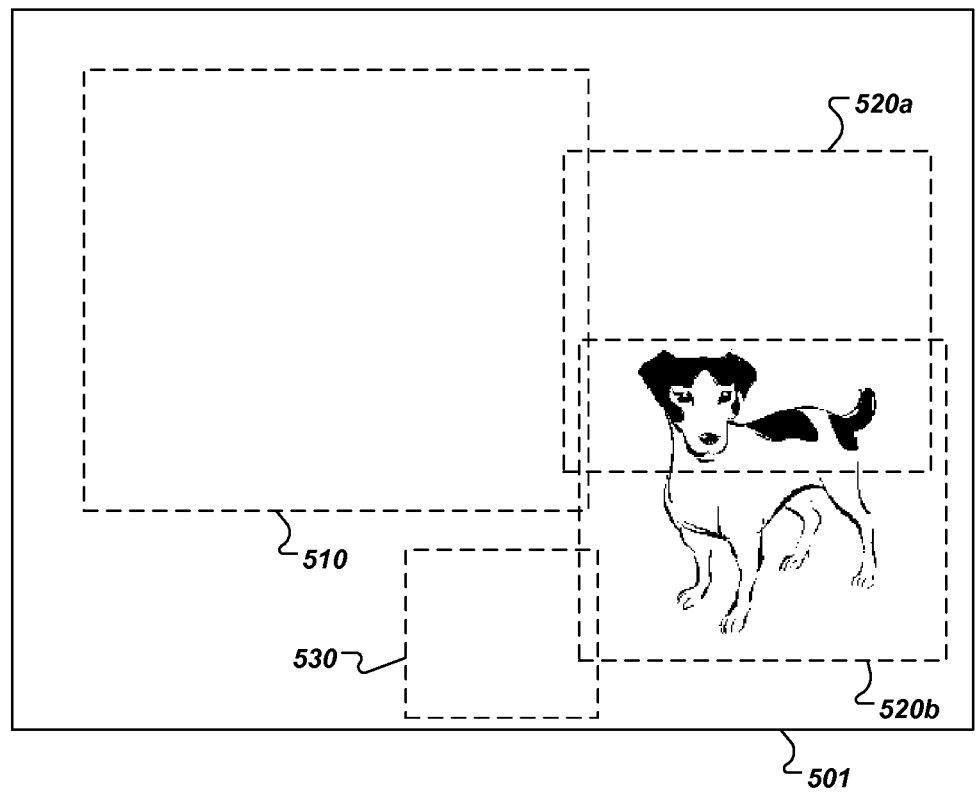
FIG. 5A illustrates using multiple subwindows in an image.

FIG. 5A illustrates using multiple subwindows in an image 501. The image 501 includes a small dog. The system can use multiple subwindows 510, 520a, 520b, and 530 in the image 501 as input to the full and partial DNN object detectors.

The system can use a range of scales that depends on the resolution of the input image and on the size of the input of the full and partial object detectors. In general, the system can use larger windows in order to ensure that the object falls within at least one subwindow, as well as smaller subwindows to detect smaller objects with higher resolution object masks. In some implementations, the system uses a full image scale and at least two other scales, where each of the other scales is half of the previous scale.

The system can also ensure that all portions of the image are covered by at least one subwindow. In some implementations, the system also ensures there is at least some overlap of windows at each scale, e.g., 5%, 10%, or 20% overlap. For example, subwindow 520a and subwindow 520b are overlapping subwindows of the same scale positioned at different locations within the image.

Thus, the system can cover the entire image at multiple scales using a relatively small number of subwindows. To avoid drawing congestion, only four subwindows are shown; however, in practice, more subwindows would be used, and the subwindows collectively would cover all portions of the image.

The system generates full and partial object masks (430). The system can provide the image subwindows as inputs to full and partial deep neural network object detectors, e.g., object detectors that have been trained as described above with reference to FIG. 2.

The outputs of the object detectors are predicted full or partial object masks for objects of a particular type at each subwindow scale. The full and partial object masks are represented in the output by a matrix of values, where nonzero values indicate the predicted presence of the object in a particular partition of the image subwindow.

The system generates merged object masks (440). The system can merge overlapping object masks generated by different subwindows at each scale. Thus, at each scale the system will have a full object mask and multiple partial object masks for each detected object in the image. The system typically only merges object masks having a same type and generated at a same scale, e.g., two full object masks or two left portion partial object masks.

The merged full or partial object mask will typically have a higher resolution than any single full or partial object mask.

Figure 5B:
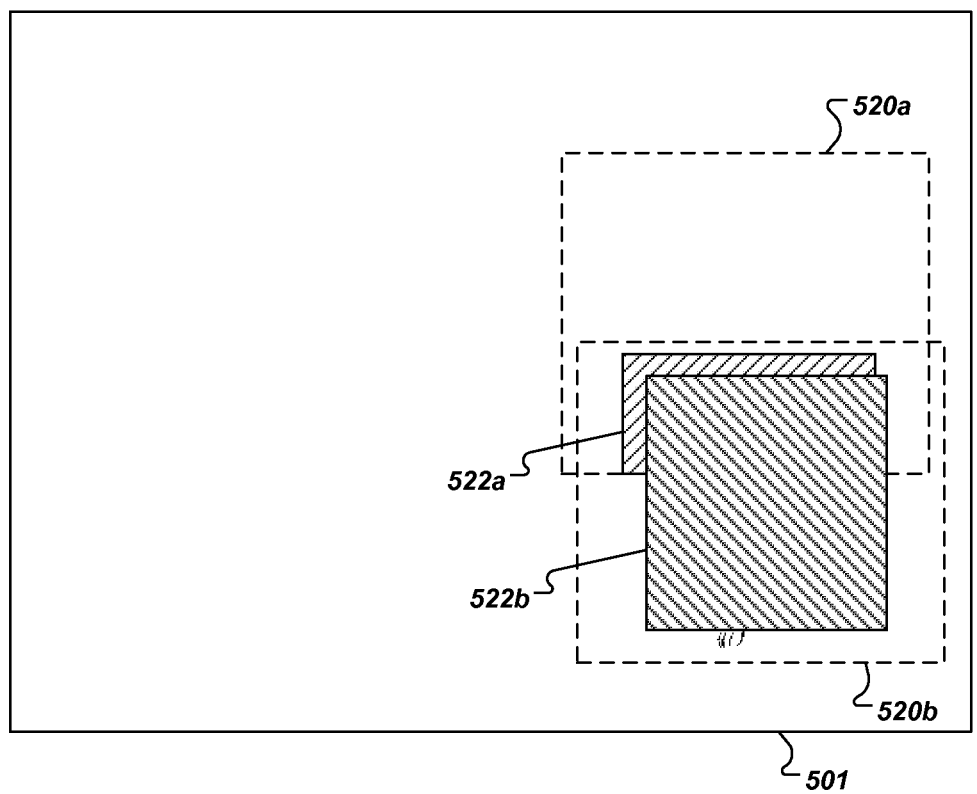
FIG. 5B illustrates overlapping object masks.

FIG. 5B illustrates overlapping object masks. The full object mask 522a is generated from a full object detector using the portion of the image corresponding to the subwindow 520a, and the full object mask 522b is likewise generated from the full object detector using the portion of the image corresponding to the subwindow 520b.

The system can generate the merged object masks by mapping the values of the output object masks at a particular scale to image coordinates, in the original image, of the corresponding subwindows. The system can then compute, for each portion of the original image, a measure of central tendency from values of the object masks generated from image subwindows mapped to that image portion. For example, the system can compute an arithmetic mean or geometric mean, a median, a mode, a minimum, or a maximum, for each portion of the image.

Figure 5C:
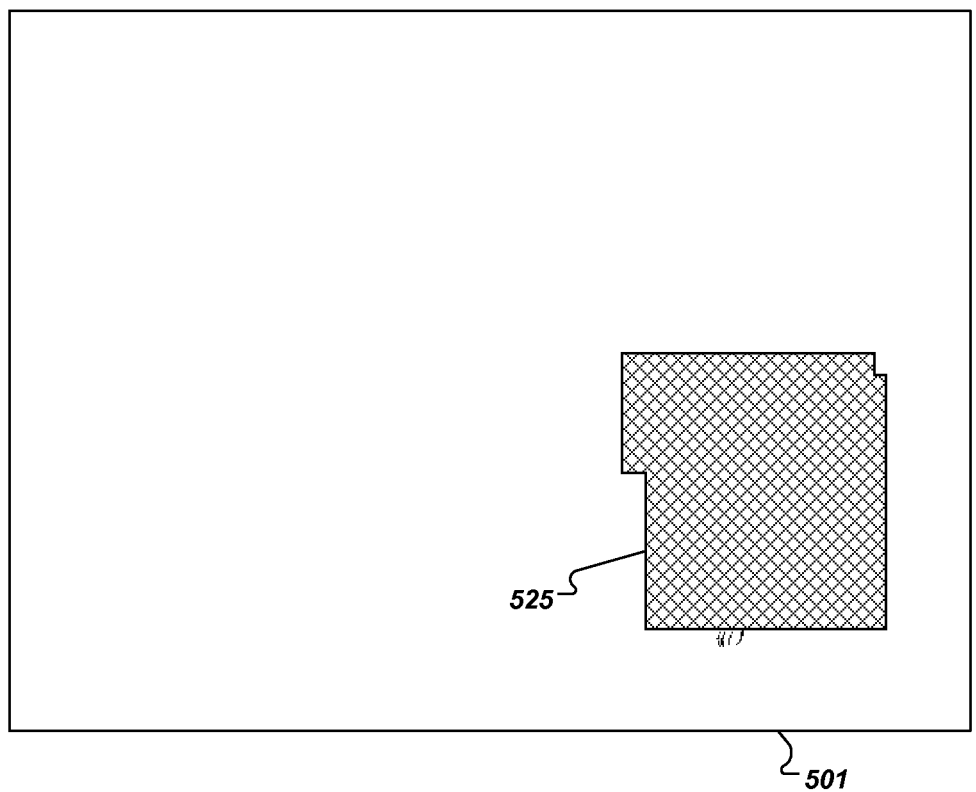
FIG. 5C illustrates a merged full object mask.

FIG. 5C illustrates a merged full object mask 525. The merged full object mask 525 is a merged version of the full object mask 522a and the full object mask 522b and corresponds generally to the location of the dog in the image 501. The higher resolution of the merged object mask may give the merged object mask 505 an irregular shape. Although FIG. 5C illustrates only one merged object mask 505, the system can similarly generate merged partial object masks that correspond to different portions of the dog in the image 501.

The system generates candidate bounding boxes (450). The system will generally determine a bounding box that is the best fit for the merged object mask. The system can consider bounding boxes having varying sizes and having varying aspect ratios.

In some implementations, the system considers bounding boxes having sizes that vary according to a ratio of a size of the image. For example, the system can generate candidate bounding boxes having a mean dimension that ranges from 0.1 to 0.9 of the mean dimension of the image, where a mean dimension is a mean of the image width and height.

The system can expand the number of candidate bounding boxes by also considering bounding boxes having different aspect ratios. The system can consider common aspect ratios, which may be aspect ratios that are common among aspect ratios of the training images. For example, the system can compute a k-means clustering of aspect ratios in the training images and determine the N most-common aspect ratios. The system can then consider bounding boxes having the N most-common aspect ratios.

The system determines scores for the candidate bounding boxes (460). The system can compute a score for each candidate bounding box by sliding the candidate bounding box through the image and determining how much of the box aligns with the merged full and partial object masks. The system can slide the candidate bounding boxes at a particular fixed pixel size, e.g., 3, 5, or 10 pixels.

To determine how well the candidate bounding box fits the merged object mask, the system can compute a score based on how much of the candidate bounding box overlaps each full and partial object mask.

Because the output values of the object masks are fixed values, the system can first map each output value m(i,j) of the object mask m to a partition T(i, j) of a portion of the image corresponding to the merged object mask.

The score S(bb, m) for a candidate bounding box bb and a particular object mask m having output values m(i,j) for each mapped image partition T(i,j) can then be given by:

$$S(bb, m) = \frac{1}{\text{area}(bb)} \sum_{(i,j)} m(i, j) \times \text{area}(bb \cap T(i, j)), \quad (2)$$

where bb(h)∩T(i, j) in equation (2) designates the portion of the mapped image partition that overlaps the candidate bounding box bb.

The total score S(bb) for the candidate bounding box over the set $m^h$ of all full and partial merged object masks can be given by:

$$S(bb) = \sum_{h} \left( S(bb(h), m^h) - S(bb(\overline{h}), m^{\overline{h}}) \right). \quad (3)$$

The term bb(h) denotes a partial bounding box that corresponds to the partial object mask. Thus, for a left partial object mask, the partial bounding box is the left half of the candidate bounding box. For the full object mask, bb(h) is the full bounding box.

The term $\overline{h}$ in equation (3) denotes an opposite object mask. For example, for a top partial object mask, the opposite partial object mask would be the bottom partial object mask. The subtraction in equation (3) indicates that the score for a particular object mask is penalized by the extent to which the opposite object mask also covers bb(h), which is the partial bounding box for the particular object mask. For example, a top portion bb(top) of the candidate bounding box should be covered well by a top partial object mask, but not covered at all by the bottom portion of the bottom partial object mask. In other words, the score is penalized by the extent to which the bottom partial object mask also covers bb(top), the top portion of the candidate bounding box. For the full object mask, $\overline{h}$, the opposite object mask is a rectangular region strictly outside the candidate bounding box. Thus, the score is penalized if the full mask extends outside the candidate bounding box.

The system can efficiently compute the score given by equation (3) when sliding the candidate bounding boxes through the image by computing only portions of the score than change. In other words, the scores contributed by the interior of the bounding box need not be recomputed on each sliding step.

Figure 5D:
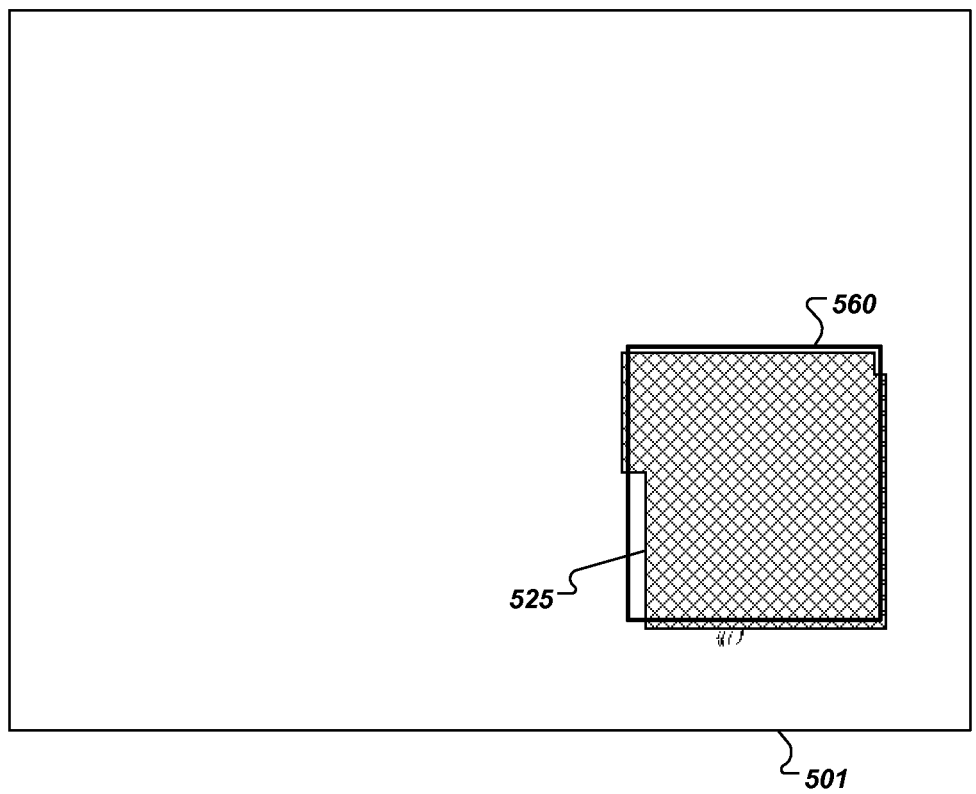
FIG. 5D illustrates a candidate bounding box.

FIG. 5D illustrates a candidate bounding box 560. The candidate bounding box 560 is positioned on the merged full object mask 525. The portions of the full object mask 525 that extend outside the candidate bounding box 560 would penalize the score of the candidate bounding box.

Figure 5E:
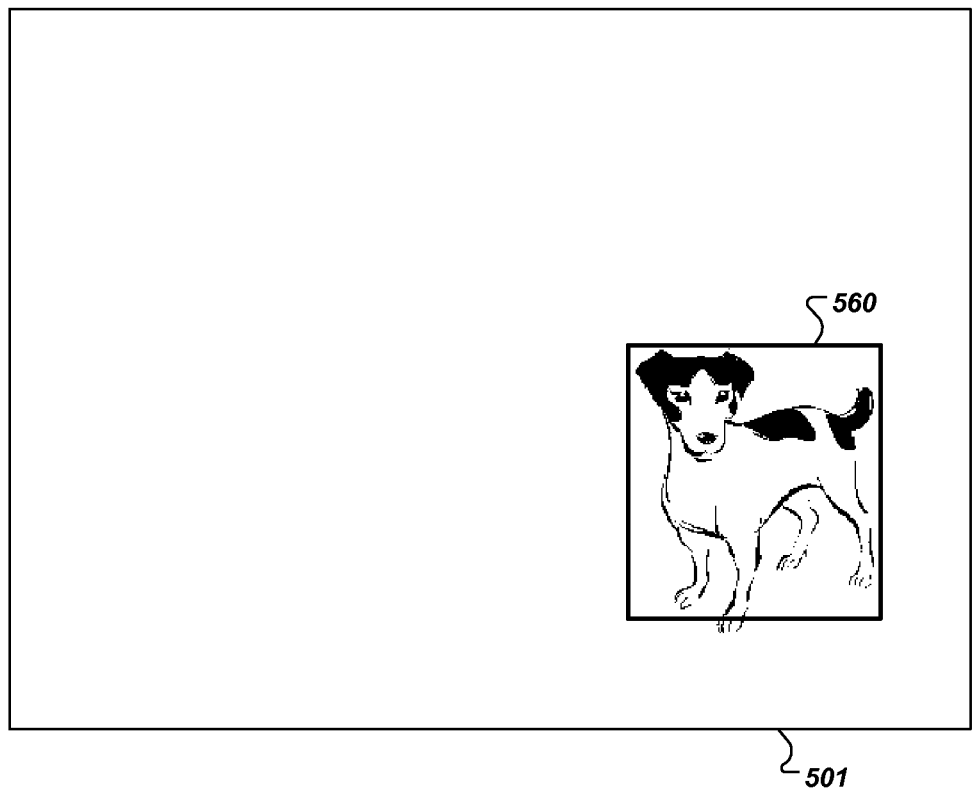
FIG. 5E illustrates a highest scoring candidate bounding box.

FIG. 5E illustrates a highest-scoring candidate bounding box 560. The highest-scoring candidate bounding box thus denotes the portion of the image 501 that includes the dog.

After computing the scores, the system can rank the candidate bounding boxes by score. In some implementations, the system keeps only the top N scoring bounding boxes at each scale and discards the others. The system may also discard candidate bounding boxes having a score below a threshold, e.g., less than 0.5, 0.8 or 0.9.

Figure 6:
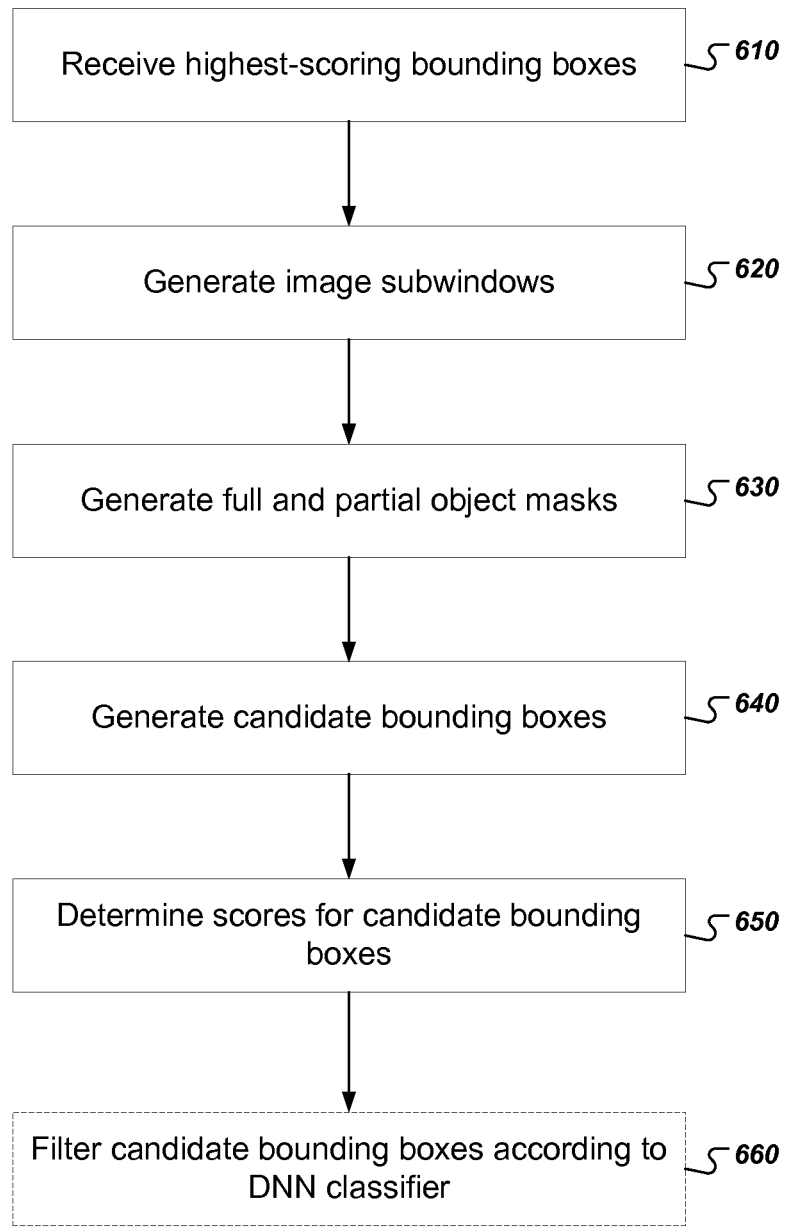
FIG. 6 is a flow chart of an example process for refining candidate bounding boxes.

At this point, the system may return a highest-scoring candidate bounding box, or perform further refinements as described in FIG. 6.

FIG. 6 is a flow chart of an example process for refining candidate bounding boxes. In general, the system perform an additional round of deep neural network object detection using highest-scoring candidate bounding boxes. In some implementations, the system performs refinement only on small objects. Thus, if one of the candidate bounding boxes is smaller than a threshold size, the system can perform an additional refinement process. The process will be described as being performed by an appropriately programmed system of one or more computers, e.g., the mask generation engine 110 and the bounding box engine 120 of FIG. 1.

The system receives the highest-scoring bounding boxes (610). The system can refine the detection of the object by repeating the detection procedure on each of the highest-scoring candidate bounding boxes at each scale.

The system generates image subwindows (620). The system generally uses image subwindows based on the highest-scoring bounding boxes. In order to improve detection, the system may enlarge the image subwindow by a particular factor, e.g., 1.1, 1.2 or 1.3.

The system generates full and partial object masks (630). The system can provide the image subwindows as inputs to full and partial deep neural network object detectors to obtain a full object mask and multiple partial object masks for each subwindow.

The system generates candidate bounding boxes (640). The system can generate candidate bounding boxes of varying sizes and aspect ratios, for example, as described above with reference to FIG. 4.

The system determines scores of the candidate bounding boxes (650). The system can use equations (2) and (3) to determine scores for the candidate bounding boxes.

After determining scores of the candidate bounding boxes, the system can select a highest-scoring bounding box as the most likely bounding box. The system can then return the selected bounding box for use by the particular application.

The system optionally filters candidate bounding boxes according to a DNN classifier (660). The system may perform one final check to determine whether the object in the image matches the object type of the object masks. Thus, the system can provide the portion of the image denoted by the highest-scoring candidate bounding box to a deep neural network classifier.

The DNN classifier will output a most likely object type for the portion of the image denoted by the bounding box. If the object type predicted by the classifier does not match the object type of the object detectors, the system can discard the candidate bounding box. The system may then select a next-highest scoring bounding box, which the system may also verify by using the DNN classifier.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   receiving, by one or more computers, an input image;
   generating, by one or more computers, a full object mask by providing the input image to a first deep neural network object detector that produces a full object mask for an object of a particular object type depicted in the input image, wherein the full object mask identifies regions of the input image that correspond to the object and regions of the input image that do not correspond to the object;
   generating, by one or more computers, a partial object mask by providing the input image to a second deep neural network object detector that produces a partial object mask for a portion of the object of the particular object type depicted in the input image; and
   determining, by one or more computers, a bounding box for the object in the image using the full object mask and the partial object mask.

2. The method of claim 1, wherein the portion of the object corresponds to the bottom portion, the top portion, the left portion, or the right portion of the object.

3. The method of claim 1, wherein the bounding box has a partial bounding box corresponding to the partial object mask, and wherein determining the bounding box for the object in the image using the full object mask and the partial object mask comprises determining a bounding box that has a best fit, among a plurality of candidate bounding boxes, of the full bounding box with the full object mask and the partial bounding box with the partial object mask.

4. The method of claim 1, wherein determining a bounding box for the object in the image using the full object mask and the partial object mask comprises:
   computing a score for each of a plurality of candidate bounding boxes based on a first measure of overlap between the bounding box and the full object mask and a second measure of overlap between the bounding box and the partial object mask; and
   determining a bounding box having a highest score.

5. The method of claim 4, wherein the score for a candidate bounding box bb is given by:

$$S(bb) = \sum_h \left( S(bb(h), m^h) - S(bb(\bar{h}), m^{\bar{h}}) \right)$$

wherein bb(h) is a partial bounding box for a corresponding partial object mask $m^h$, wherein bb($\bar{h}$) is an opposite partial bounding box for a corresponding opposite partial object mask $m^{\bar{h}}$, and S(bb(h), $m^h$) is a measure of overlap between the partial bounding box and the partial object mask.

6. The method of claim 4, further comprising:
   generating a second full object mask by providing a portion of the image corresponding to the bounding box to the first deep neural network object detector;
   generating a second partial object mask by providing the portion of the image corresponding to the bounding box to the second deep neural network object detector;
   computing a score for each of a second plurality of candidate bounding boxes based on a third measure of overlap between each bounding box and the second full object mask and a fourth measure of overlap between each bounding box and the second partial object mask; and
   determining a refined bounding box of the second plurality of candidate bounding boxes having a highest score.

7. The method of claim 1, further comprising:
   determining full and partial object masks for subwindows of each of multiple subwindow scales; and
   merging object masks determined at same values of the subwindow scales.

8. The method of claim 7, wherein merging the object masks determined at the multiple values of the scale s comprises averaging the object masks.

9. The method of claim 1, wherein determining full and partial object masks for subwindows of each of multiple subwindow scales comprises determining full and partial object masks for no more than 50 subwindows.

10. The method of claim 1, further comprising:
    generating a predicted object type by providing the input image to a third deep neural network classifier that produces a predicted object type for a portion of the image corresponding to the bounding box;
    determining that the predicted object type does not match the particular object type; and
    removing the bounding box from consideration.

11. A system comprising:
    one or more computers and one or more storage devices storing instructions that are operable, when executed by the one or more computers, to cause the one or more computers to perform operations comprising:
    receiving an input image;
    generating a full object mask by providing the input image to a first deep neural network object detector that produces a full object mask for an object of a particular object type depicted in the input image, wherein the full object mask identifies regions of the input image that correspond to the object and regions of the input image that do not correspond to the object;

generating a partial object mask by providing the input image to a second deep neural network object detector that produces a partial object mask for a portion of the object of the particular object type depicted in the input image; and determining a bounding box for the object in the image using the full object mask and the partial object mask.

12. The system of claim 11, wherein the portion of the object corresponds to the bottom portion, the top portion, the left portion, or the right portion of the object.

13. The system of claim 11, wherein the bounding box has a partial bounding box corresponding to the partial object mask, and wherein determining the bounding box for the object in the image using the full object mask and the partial object mask comprises determining a bounding box that has a best fit, among a plurality of candidate bounding boxes, of the full bounding box with the full object mask and the partial bounding box with the partial object mask.

14. The system of claim 11, wherein determining a bounding box for the object in the image using the full object mask and the partial object mask comprises:

computing a score for each of a plurality of candidate bounding boxes based on a first measure of overlap between the bounding box and the full object mask and a second measure of overlap between the bounding box and the partial object mask; and determining a bounding box having a highest score.

15. The system of claim 14, wherein the score for a candidate bounding box bb is given by:

$$S(bb) = \sum_h \left( S(bb(h), m^h) - S(bb(\bar{h}), m^{\bar{h}}) \right)$$

wherein bb(h) is a partial bounding box for a corresponding partial object mask $m^h$, wherein bb($\bar{h}$) is an opposite partial bounding box for a corresponding opposite partial object mask $m^{\bar{h}}$, and $S(bb(h), m^h)$ is a measure of overlap between the partial bounding box and the partial object mask.

16. The system of claim 14, wherein the operations further comprise:

generating a second full object mask by providing a portion of the image corresponding to the bounding box to the first deep neural network object detector;

generating a second partial object mask by providing the portion of the image corresponding to the bounding box to the second deep neural network object detector;

computing a score for each of a second plurality of candidate bounding boxes based on a third measure of overlap between each bounding box and the second full object mask and a fourth measure of overlap between each bounding box and the second partial object mask; and determining a refined bounding box of the second plurality of candidate bounding boxes having a highest score.

17. The system of claim 11, wherein the operations further comprise:

determining full and partial object masks for subwindows of each of multiple subwindow scales; and merging object masks determined at same values of the subwindow scales.

18. The system of claim 17, wherein merging the object masks determined at the multiple values of the scale s comprises averaging the object masks.

19. The system of claim 11, wherein determining full and partial object masks for subwindows of each of multiple subwindow scales comprises determining full and partial object masks for no more than 50 subwindows.

20. The system of claim 11, wherein the operations further comprise:

generating a predicted object type by providing the input image to a third deep neural network classifier that produces a predicted object type for a portion of the image corresponding to the bounding box;

determining that the predicted object type does not match the particular object type; and removing the bounding box from consideration.

21. A computer program product, encoded on one or more non-transitory computer storage media, comprising instructions that when executed by one or more computers cause the one or more computers to perform operations comprising:

receiving an input image;

generating a full object mask by providing the input image to a first deep neural network object detector that produces a full object mask for an object of a particular object type depicted in the input image, wherein the full object mask identifies regions of the input image that correspond to the object and regions of the input image that do not correspond to the object;

generating a partial object mask by providing the input image to a second deep neural network object detector that produces a partial object mask for a portion of the object of the particular object type depicted in the input image; and determining a bounding box for the object in the image using the full object mask and the partial object mask.

* * * * *